A. ERAT.
NON-SKID DEVICE FOR AUTOMOBILES.
APPLICATION FILED FEB. 11, 1920.
1,401,245. Patented Dec. 27, 1921.
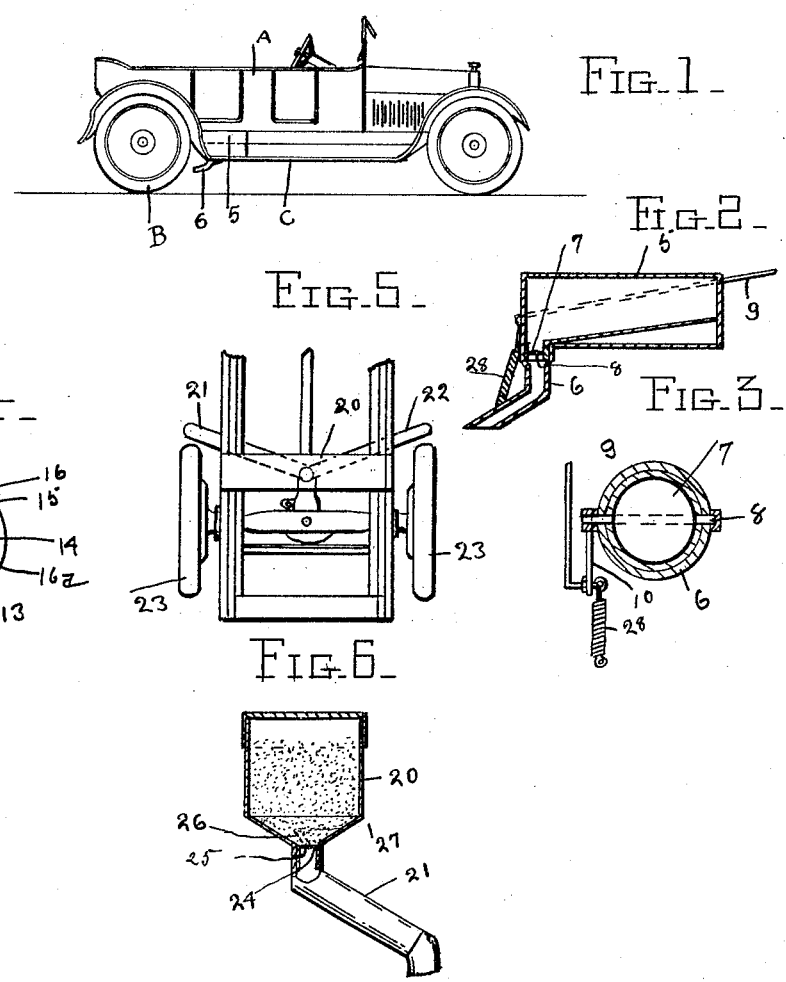

UNITED STATES PATENT OFFICE.

ADOLPH ERAT, OF EASTHAMPTON, MASSACHUSETTS.

NON-SKID DEVICE FOR AUTOMOBILES.

1,401,245.  Specification of Letters Patent.  Patented Dec. 27, 1921.

Application filed February 11, 1920. Serial No. 357,835.

*To all whom it may concern:*

Be it known that I, ADOLPH ERAT, a citizen of the United States of America, and resident of Easthampton, in the county of Hampshire and State of Massachusetts, have invented certain new and useful Improvements in Non-Skid Devices for Automobiles, of which the following is a full, clear, and exact description.

This invention relates to improvements in means for preventing automobiles and vehicles from skidding and consists in the provision of a sand receptacle adapted to be supported on the running board of an automobile or vehicle, under one of the seats or otherwise as may be desired and means controllable from the dash board of the vehicle for permitting quantities of the sand to flow onto the ground in advance of the rear wheels.

Another object of the invention is to provide means for regulating the valve action controlling the outflow of the sand.

With the above and other objects in view the invention relates to certain new and useful constructions, combinations and arrangements of parts, clearly described in the following specification and fully illustrated in the accompanying drawings in which:

Figure 1 is a side elevation of an automobile showing the sand receptacle mounted on the running board of the vehicle.

Fig. 2 is a vertical longitudinal sectional view through the cam container and valve.

Fig. 3 is a transverse sectional view of an enlarged scale of the valve.

Fig. 4 is a front elevation of an operating indicator.

Fig. 5 is a plan view of an automobile showing a modified form of the invention.

Fig. 6 is a vertical sectional view thereof on an enlarged scale.

Referring to the accompanying drawing A designates an automobile of any approved construction which is provided with rear wheels B and a running board C.

On the running board C a receptacle 5 is disposed and provided with a sand distributing nozzle or outlet 6 which is downwardly and rearwardly directed to distribute sand in advance of the rear wheel adjacent thereto. A similar receptacle being located on the opposite side of the vehicle.

A valve member 7 shown to be in the form of a tilting valve disk is pivoted upon the shaft 8 in the outlet member 6 to prevent and regulate the outflow of sand from the receptacle 5 and the valve member or disk 7 is operated by means of a wire or cable 9 which is connected to the crank 10 of the shaft 8.

The wire or cable 9 extends forwardly to the dash board over the guide 11 and is connected with the crank arm 12 mounted upon the shaft 13, which is arranged to rotate on the dash board D. The shaft 13 carries a knob 14 on its outer end which is equipped with a pointer 15 movable over the dial 16, which is provided with a series of numbers or letters or indicating various adjustments of the disk valve or member. The dial 16 is also provided with small notches 16ª whereby the pointer 15 may be locked in registration with either of the numbers or adjustment points on the dial.

In Figs. 5 and 6 I show a modified form of the invention wherein a single receptacle 20 is employed, which may be mounted on the frame of the vehicle in any suitable position and which is provided with a pair of diverging distributing pipes 21 and 22 which are adapted to distribute the sand against the rear wheels 23.

The outflow of sand from the receptacle 20 through the distributing pipes 21 and 22 is controlled by means of a single valve 24 pivoted upon the shaft 25 and operated through the medium of the lever 26 and the operating wire or cable 27 which extends forwardly and has operative connections with the lever 12 of the dash board equipment. In both forms of the invention the disk valve is held in a normally closed position by means of the spring 28.

When the driver passes over a road that is slippery he can instantly distribute sand in advance of the wheels so as to prevent skidding and the action of the sand will absolutely insure a positive non-slipping traction of the wheels upon the roadway.

Having described my invention I claim:

A non-skid device for automobiles consisting of a sand receptacle having a single outlet and diverging distributing pipes connected thereto for distributing sand in advance of the wheels of the automobile, a valve disk located in the outlet for opening and closing the same, a lever connected with said valve disk, a shaft adapted to be mounted on the dash board of the automobile, a crank arm connected with said shaft, a flexible connection between the crank arm and the lever and a dial for indicating on the dash board the position of the valve disk relative to the outlet.

Signed by me at Springfield, Mass., in presence of a subscribing witness.

ADOLPH ERAT.

Witness:
JOSEPH J. O'BRIEN.